(12) United States Patent
Fan

(10) Patent No.: US 10,386,673 B2
(45) Date of Patent: Aug. 20, 2019

(54) LIQUID CRYSTAL DISPLAY DEVICE AND LIQUID CRYSTAL DISPLAY MODULE THEREOF

(71) Applicant: Shenzhen China Star Optoelectronics Technology Co., Ltd., Shenzhen, Guangdong (CN)

(72) Inventor: Yong Fan, Guangdong (CN)

(73) Assignee: Shenzhen China Star Optoelectronics Technology Co., Ltd., Shenzhen, Guangdong (CN)

(*) Notice: Subject to any disclaimer, the term of this patent is extended or adjusted under 35 U.S.C. 154(b) by 725 days.

(21) Appl. No.: 14/777,824

(22) PCT Filed: Aug. 14, 2015

(86) PCT No.: PCT/CN2015/087004
§ 371 (c)(1),
(2) Date: Sep. 17, 2015

(87) PCT Pub. No.: WO2017/024600
PCT Pub. Date: Feb. 16, 2017

(65) Prior Publication Data
US 2018/0143491 A1    May 24, 2018

(30) Foreign Application Priority Data

Aug. 11, 2015 (CN) .......................... 2015 1 0489412

(51) Int. Cl.
G02F 1/1335 (2006.01)

(52) U.S. Cl.
CPC .. *G02F 1/133602* (2013.01); *G02F 1/133528* (2013.01); *G02F 1/133617* (2013.01);
(Continued)

(58) Field of Classification Search
CPC ........ G02B 27/0172; G02B 2027/0178; G02B 2027/0118; G02B 5/30; G02B 2027/0147;
(Continued)

(56) References Cited

U.S. PATENT DOCUMENTS

2010/0208172 A1    8/2010   Jang et al.
2011/0089809 A1*   4/2011   Noh .................. B82Y 20/00
                                                         313/483
(Continued)

FOREIGN PATENT DOCUMENTS

CN         201107513 Y  *   8/2008
CN         201107513 Y      8/2008
(Continued)

*Primary Examiner* — Huyen Ngo
(74) *Attorney, Agent, or Firm* — Andrew C. Cheng

(57) ABSTRACT

A liquid crystal display device and a liquid crystal display module are disclosed. The liquid crystal display module comprises a backlight unit, a liquid crystal display panel, and a quantum rod film between the backlight unit and the liquid crystal display panel. The liquid crystal display panel comprises an upper substrate, a lower substrate, a liquid crystal being filled between the upper and lower substrate, and an upper polarizer arranged at the outer side of the upper substrate, that is the light-emitting side of the liquid crystal display panel. The quantum rod film is arranged between the lower substrate and the backlight unit. The liquid crystal display module adopts the quantum rod material that may emit polarized light to replace the conventional color filter and the lower polarizer to achieve the purposes of high contrast, high color saturation, low power consumption and low cost for the color liquid crystal display.

19 Claims, 4 Drawing Sheets

(52) U.S. Cl.
CPC ............ *G02F 2001/133548* (2013.01); *G02F 2001/133614* (2013.01)

(58) Field of Classification Search
CPC .......... G02B 2027/0112; G02B 6/0028; G06F 3/013; G06T 19/006; G09G 3/3208; G09G 2340/0478; G09G 3/3225; G09G 3/3233
See application file for complete search history.

(56) References Cited

U.S. PATENT DOCUMENTS

| | | | |
|---|---|---|---|
| 2012/0113672 A1* | 5/2012 | Dubrow | ................ B82Y 20/00 362/602 |
| 2013/0107170 A1 | 5/2013 | Gee et al. | |
| 2013/0135558 A1 | 5/2013 | Kim et al. | |
| 2013/0341588 A1 | 12/2013 | Jeon et al. | |
| 2014/0016296 A1 | 1/2014 | Jeon et al. | |
| 2014/0362556 A1 | 12/2014 | Cho et al. | |
| 2015/0009440 A1 | 1/2015 | Lee et al. | |
| 2015/0253474 A1* | 9/2015 | Guo | ....................... B32B 17/06 362/97.2 |

FOREIGN PATENT DOCUMENTS

| | | | | |
|---|---|---|---|---|
| CN | 103091892 A | * | 5/2013 | ......... G02F 1/13362 |
| CN | 104145210 A | | 11/2014 | |
| CN | 104749680 A | | 7/2015 | |
| CN | 104749681 A | * | 7/2015 | |
| CN | 104749681 A | | 7/2015 | |
| KR | 1020140086058 A | | 7/2014 | |

* cited by examiner

LIQUID CRYSTAL DISPLAY DEVICE AND LIQUID CRYSTAL DISPLAY MODULE THEREOF

BACKGROUND

Technical Field

The disclosure is related to liquid crystal display technology field, and more particular to a liquid crystal display device and liquid crystal display module thereof.

Related Art

Quantum dot is one kind of nanoparticles having size between 1 to 20 nm. Because the photoluminescence (PL) of the quantum dot has the characteristics of narrow FWHM (full width at half maximum, referring to the spectral width which is wavelength interval over which the magnitude of all spectral components is half the magnitude of the component having the maximum value, that is the value of pulse width at half of the peak value), the emission peak wavelength may be adjusted according to the size of the quantum dot. The photoluminescence e refers to the process that uses a light to excite the electrons in the material in order to achieve luminescence. It is the phenomenon occurring accompanying with the complex process of the additional photo-generated carriers pair. Because the quantum dots have such characteristics, the quantum dots used as a light source in the display field may achieve high color saturation, making colors more brilliant. Therefore, the quantum dots technology have been widely applied in the backlight module of the liquid crystal display device in recent years. However, the emitted light hardly has the polarization after the quantum dots absorb the polarized blue light. As shown in FIG. 1, FIG. 1 is the schematic diagram illustrating the depolarization characteristic of quantum dots. In the figure, the reference number 101 refers to the quantum dots, 102 refers to the linearly y polarized light, 103 refers to the non-linear polarized quantum dot emitting light passing through the quantum dots.

SUMMARY

The disclosure provides a liquid crystal display device and a liquid crystal display module thereof to solve the technical problems of the depolarization characteristics of the quantum dots adopted as the component material of the liquid crystal display device and the complex structures of the liquid crystal display assembly in the prior art.

In order to solve the problem, the disclosure provides a liquid crystal display module comprising a backlight unit, a liquid crystal display panel, and a quantum rod film between the backlight unit and the liquid crystal display panel, wherein the liquid crystal display panel comprises: an upper substrate; a lower substrate, a liquid crystal filled between the upper substrate and the lower substrate; and an upper polarizer arranged at the outer side of the upper substrate, that is the light-emitting side of the liquid crystal display panel; wherein the quantum rod film is arranged between the lower substrate and the backlight unit.

In one embodiment, the backlight unit provides blue backlight.

In one embodiment, the quantum rod film is arranged between the lower substrate and the backlight unit, the quantum rod film comprises a red quantum rod film region, a green quantum rod film region, a transmissive region spaced alternatively, and a polarizing layer arranged on the upper surface or the lower surface of the red quantum rod film region, the green quantum rod film region, and the transmissive region; wherein the diameter of the red quantum rod film region and the diameter of the green quantum rod film region is different.

In one embodiment, the quantum rod film further comprises a protection layer arranged on the upper surface and the lower surface of the red quantum rod film region, the green quantum rod film region, and the transmissive region.

In one embodiment, the transmissive axis of the polarizing layer is parallel to the direction of the long axis of the quantum rod in the red quantum rod film region and the green quantum rod film region such that the light passing through different transmissive regions of the quantum rod film has the same polarization direction.

In one embodiment, the backlight unit provides purple backlight.

In one embodiment, the quantum rod film comprises a polarized light-emitting layer composed by an arrangement of quantum rods with three diameters and a protection layer arranged on the upper surface and the lower surface of the polarized light-emitting layer.

In one embodiment, the liquid crystal panel further comprises a color filter film arranged on the lower surface of the upper substrate, and the upper substrate and/or the lower substrate adopts violet filtering material or is coated with a violet filtering film.

In one embodiment, the liquid crystal display panel further comprises a plurality of spacers arranged between the upper substrate and the lower substrate, the spacers isolate the liquid crystal into a plurality of regions, and each of the regions respectively corresponds to a transmissive region of the quantum rod film.

In order to solve the problem, the disclosure further provides a liquid crystal display device comprising the liquid crystal display module as mentioned in the above embodiments.

Compared with the prior art, the liquid crystal display device and the liquid crystal display module provided by the disclosure adopts the quantum rod material that may emit polarized light to replace the conventional color filter (or light enhancing assembly) and the lower polarizer to achieve the purposes of high contrast, high color saturation, low power consumption and low cost. Theatrically the power consumption is ⅓ of that of the conventional liquid crystal display device. And because there is no lower polarizer and RGB color filter layer (or light enhancing assembly), and the quantum rod film completely substitutes the lower polarizer and RGB color filter layer (or light enhancing assembly), the components and the manufacture processes are fewer. The purpose of cost reduction is achieved. The quantum rod film may excite the polarized light. The light having different color may be obtained through adjusting the diameter of the quantum rod of the quantum rod film to emit the polarized with different wavelength. The display requirement of the liquid crystal display device is satisfied.

BRIEF DESCRIPTION OF THE DRAWINGS

The above and other exemplary aspects, features and advantages of certain exemplary embodiments of the present disclosure will be more apparent from the following description taken in conjunction with the accompanying drawings, in which.

DETAILED DESCRIPTION

The following description with reference to the accompanying drawings is provided to explain the exemplary embodiments of the disclosure. It will be apparent, however, that the disclosure may be practiced by one or more embodiments, and the specific embodiments provided herein cannot be interpreted to limit the disclosure. On the contrary, those embodiments are provided to explain the principle and the application of the disclosure such that those skilled in the art may understand the various embodiments of the disclosure and the various modifications for specific expected application.

Figure 1:
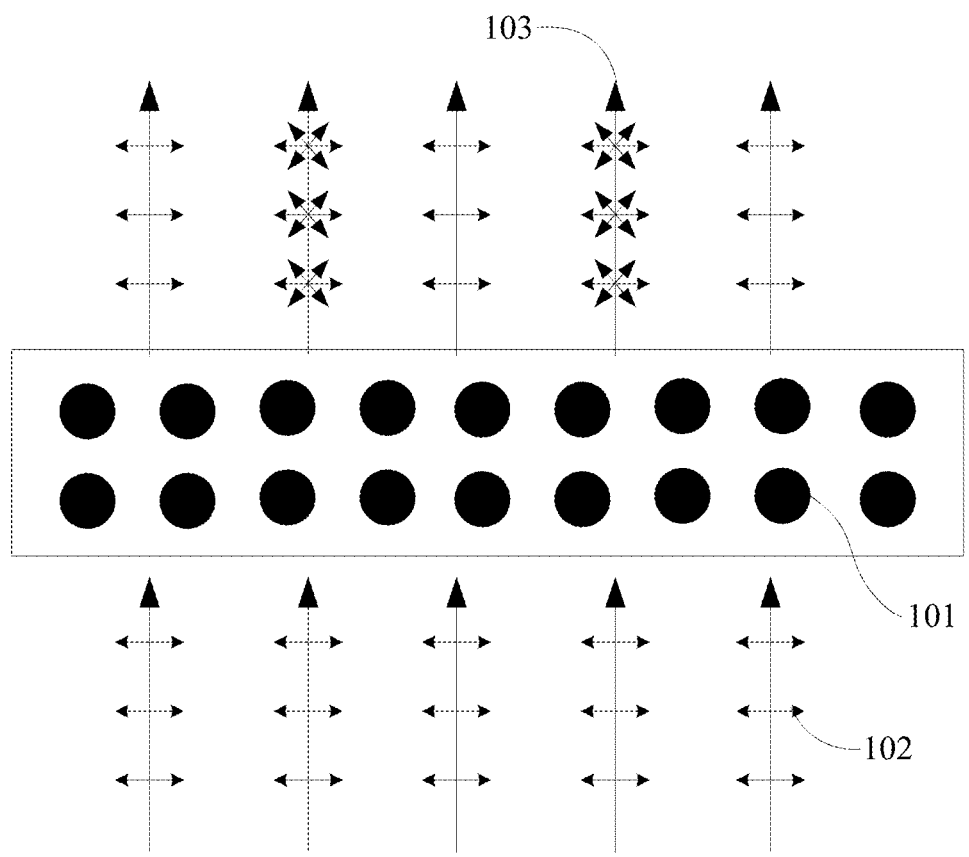
FIG. 1 is the schematic diagram illustrating the depolarization characteristic of quantum dots.
Figure 2:
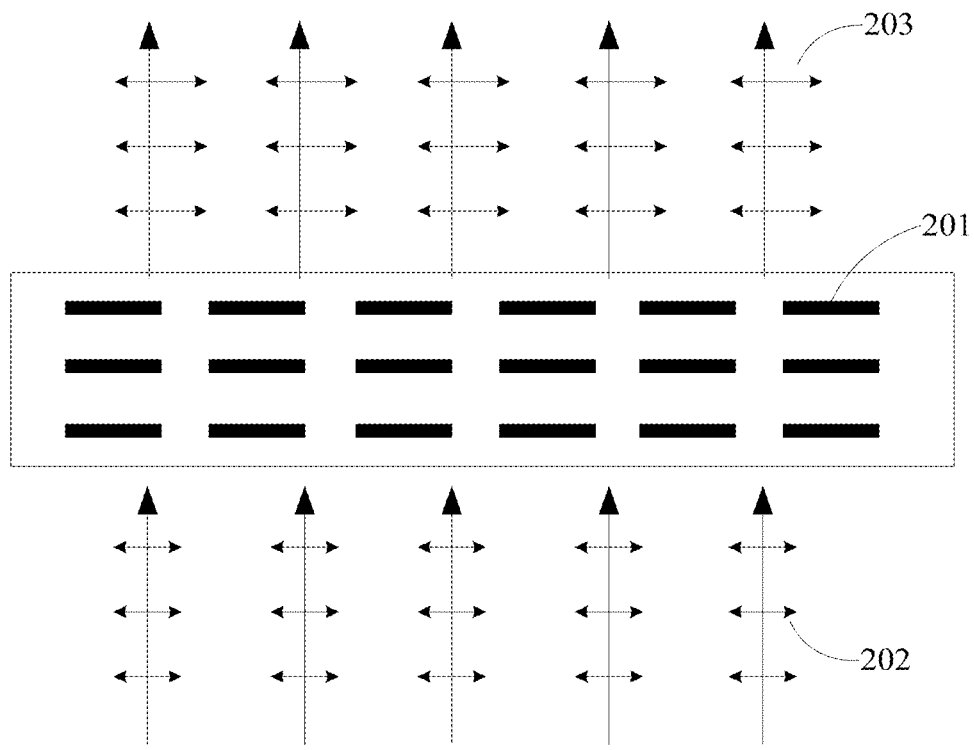
FIG. 2 is the schematic diagram illustrating that the quantum rods exciting the polarized light.

Refer to FIG. 2. FIG. 2 is the schematic diagram illustrating that the quantum rods exciting the polarized light. The quantum rod is a nanomaterial of one-dimensional quantum confinement, having emitting characteristics similar to that of the quantum dots. The emission spectrum wavelength may be adjusted based on the diameter of the quantum rod, and FWHM (full width at half maximum, referring to the spectral width which is wavelength interval over which the magnitude of all spectral components is half the magnitude of the component having the maximum value, that is the value of pulse width at half of the peak value) of the emission spectrum is as narrow as that of the quantum dots. Compared with the quantum dots, the most significant feature is that after the blue light (either natural light or polarized light) excites the quantum rod to emit light, the quantum rod may emit a polarized light which is highly polarized (under the case of a single intrinsic luminescence), with the vibration direction along the direction of the long axis of the quantum rods, as shown in FIG. 2. 201 refers to the quantum rod, 202 refers to the linearly polarized blue light, and 203 refers to the polarized light vibrating along the direction of the long axis of the quantum rods.

Figure 3:
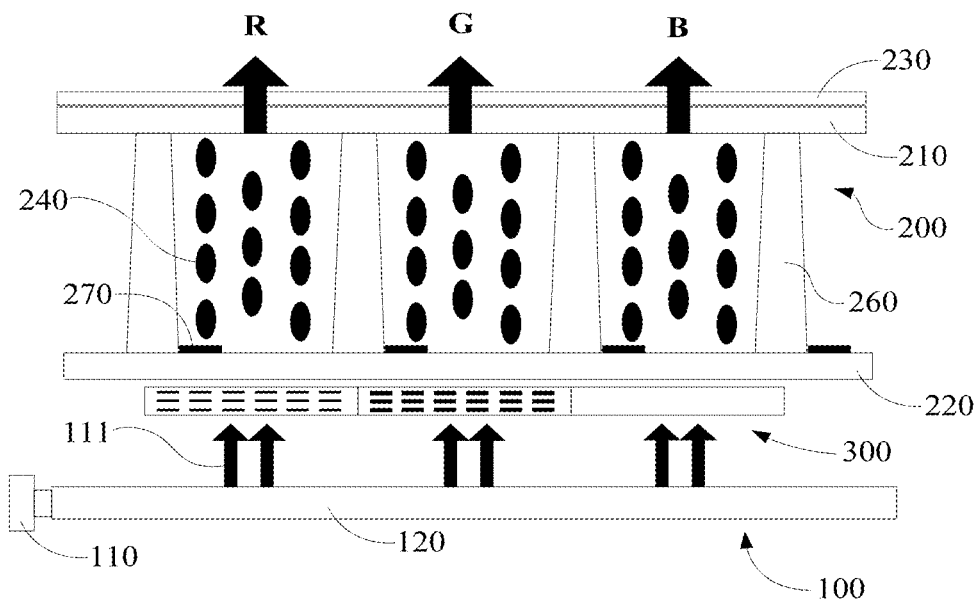
FIG. 3 is the schematic diagram illustrating the first embodiment of the liquid crystal display module of the disclosure.

Refer to FIG. 3. FIG. 3 is the schematic diagram illustrating the first embodiment of the liquid crystal display module of the disclosure. The liquid crystal display module comprises, but does not limit to, a backlight unit 100, a liquid crystal display panel 20, and a quantum rod film 300 between the backlight unit 100 and the liquid crystal display panel 200.

Specifically, the liquid crystal display panel 200 comprises an upper substrate 210, a lower substrate 220, and an upper polarizer 230. A liquid crystal 240 filled between the upper substrate 210 and the lower substrate 220. The upper polarizer 230 is arranged at the outer side of the upper substrate 210. The quantum rod film 300 is specifically arranged between the lower substrate 220 and the backlight unit 100. The backlight unit 100 provides a backlight. The light passes through the quantum rod film 300 and goes into the liquid crystal display panel 200 from the bottom of the lower substrate 200.

In this embodiment, the backlight unit 100 provides blue backlight. The backlight unit 100 further comprises a blue light lamp 110 and a light guide plate 120. The blue light lamp 110 is arranged at the side of the light guide plate 120. 111 in the figure indicates that the backlight unit 100 emits the blue light.

Figure 4:
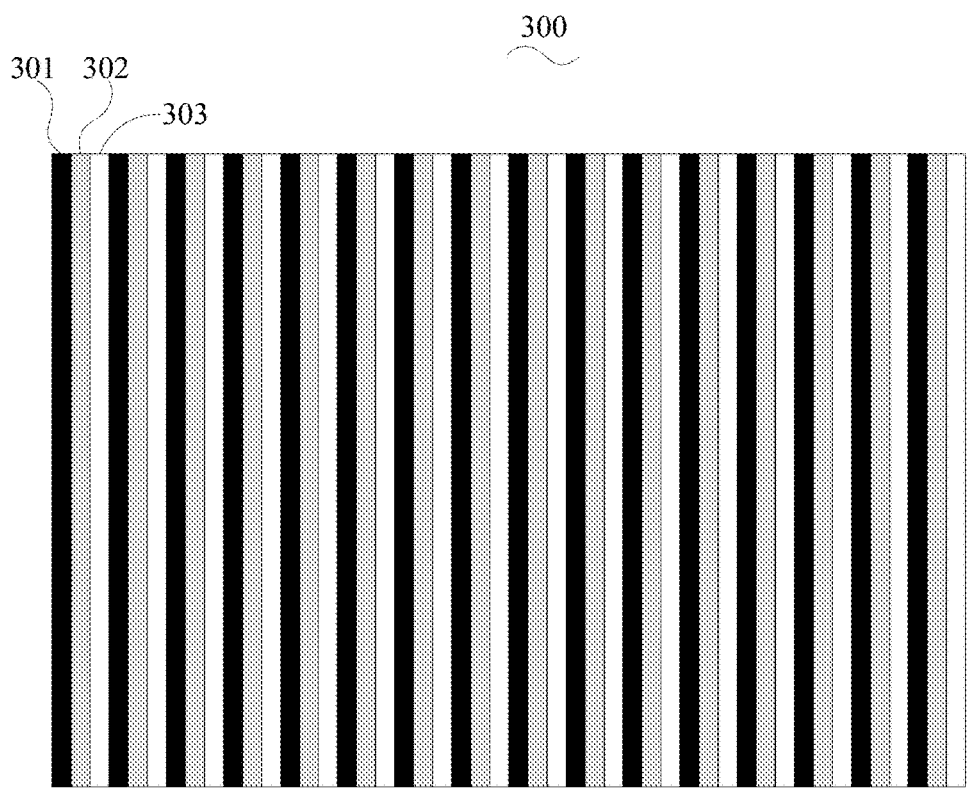
FIG. 4 is the front view of the quantum rod film of the embodiment in FIG. 3.
Figure 5:
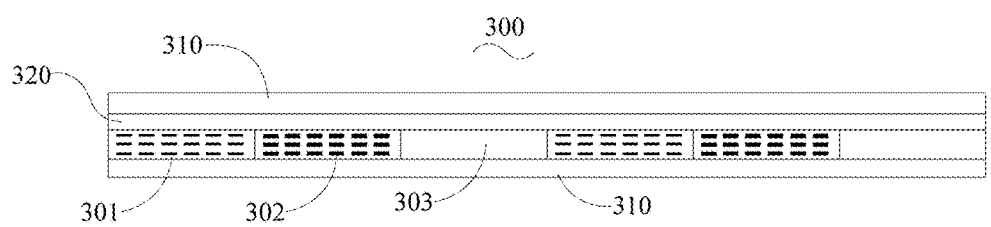
FIG. 5 is the sectional view of the quantum rod film in FIG. 4.

Refer to FIG. 4 and FIG. 5 together. FIG. 4 is the front view of the quantum rod film of the embodiment in FIG. 3. FIG. 5 is the sectional view of the quantum rod film in FIG. 4. The quantum rod film 300 comprises a red quantum rod film region 301, a green quantum rod film region 302, a transmissive region 303 spaced alternatively. According to the quantum rods characteristics, the emission spectrum wavelength may be adjusted based on the diameter of the quantum rod. Therefore, the diameter of the red quantum rod film region 301 is different from that of the green quantum rod film region 302 such that when the blue light irradiates on the red quantum rod film region 301 and the green quantum rod film region 302 of the quantum rod film 300 a red light and a green light may be obtained. Furthermore, when the blue light irradiates on the transmissive region 303, the light directly passes through the transmissive region 303 such that three primary colors of red (R), green (G) and blue (B) for display are generated after the blue light irradiates on the quantum rod film 300.

Further, the quantum rod film 300 further comprises a polarizing layer 320 arranged on the upper surface or the lower surface of the red quantum rod film region 301, the green quantum rod film region 302, and the transmissive region 303. The transmissive axis of the polarizing layer 320 is parallel to the direction of the long axis of the quantum rod in the red Quantum rod film region 301 and the green quantum rod film region 302 such that the light passing through different transmissive regions (or different color region) of the quantum rod film 300 has the same polarization direction.

In one embodiment, the quantum rod film 300 further comprises a protection layer 310 arranged on the upper surface and the lower surface of the red quantum rod film region 301, the green quantum rod film 302 region, and the transmissive region 303. The protective layer 310 is capable of blocking water and oxygen to prevent the lifetime the oxidized quantum rod from rapid decay.

Further, continue to refer to FIG. 3. The liquid crystal display panel 200 further comprises a plurality of spacers 260 arranged between the upper substrate 210 and the lower substrate 220. The spacers 260 isolate the liquid crystal 240 into a plurality of regions, and each of the regions respectively corresponds to a transmissive region (that is a transmissive region of a primary color) of the quantum rod film 300 to achieve the individual control on the primary color in different primary color region.

Of course, the liquid crystal display panel 200 further comprises a TFT (Thin Film Transistor) 270, a pixel electrode (not shown) and a common electrode (not shown). These technical features fall within the scope of understanding of the skilled person in the art, and are not repeated again.

The liquid crystal display module provided by the disclosure adopts the quantum rod material that may emit polarized light to replace the conventional color filter and the lower polarizer to achieve the purposes of high contrast, high color saturation, low power consumption and low cost. Theatrically the power consumption is ⅓ of that of the conventional liquid crystal display device. The power consumption is extremely low. And because there is no lower polarizer and RGB color filter layer, and the quantum rod film completely substitute the lower polarizer and RGB color filter layer, the components and the manufacture processes are fewer. The purpose of cost reduction is achieved. The quantum rod film may excite the polarized light. The light having different color may be obtained through adjusting the diameter of the quantum rod of the quantum rod film to emit the polarized with different wavelength. The display requirement of the liquid crystal display device is satisfied.

Figure 6:
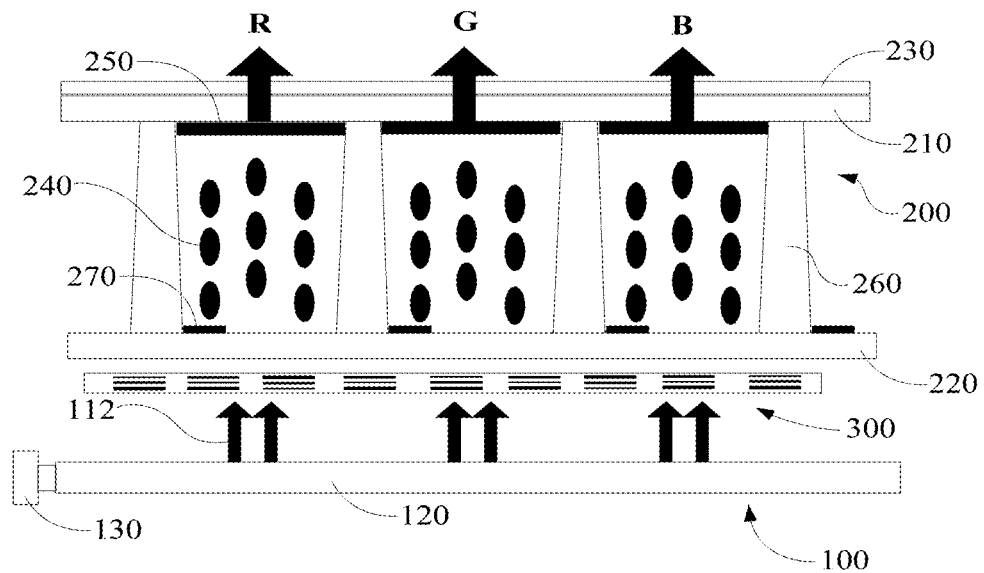
FIG. 6 is the schematic diagram illustrating the second embodiment of the liquid crystal display module of the disclosure.

Refer to FIG. 6. FIG. 6 is the schematic diagram illustrating the second embodiment of the liquid crystal display module of the disclosure. The liquid crystal display module comprises, but does not limit to, a backlight unit 100, a liquid crystal display panel 20, and a quantum rod film 300 between the backlight unit 100 and the liquid crystal display panel 200.

Specifically, the liquid crystal display panel 200 comprises an upper substrate 210, a lower substrate 220, and an upper polarizer 230. A liquid crystal 240 filled between the upper substrate 210 and the lower substrate 220. The upper polarizer 230 is arranged at the outer side of the upper substrate 210. The quantum rod film 300 is specifically arranged between the lower substrate 220 and the backlight unit 100. The backlight unit 100 provides a backlight. The light passes through the quantum rod film 300 and goes into the liquid crystal display panel 200 from the bottom of the lower substrate 200.

In this embodiment, the backlight unit 100 provides purple backlight. The backlight unit 100 further comprises a purple light lamp 130 and a light guide plate 120. The purple light lamp 130 is arranged at the side of the light guide plate 120. 112 in the figure indicates that the backlight unit 100 emits the purple light.

Figure 7:
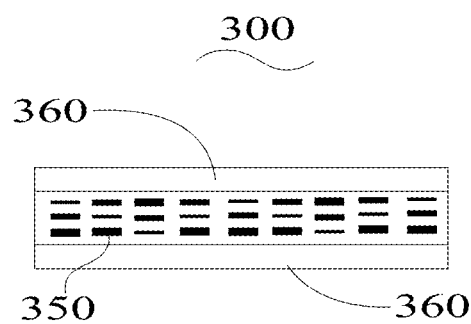
FIG. 7 is the front view of the quantum rod film of the embodiment in FIG. 6.

FIG. 7 is the front view of the quantum rod film of the embodiment in FIG. 6. In this embodiment, the quantum rod film 300 comprises a polarized light-emitting layer 350 composed by an arrangement of quantum rods with three diameters. According to the quantum rods characteristics, the emission spectrum wavelength may be adjusted based on the diameter of the quantum rod. Therefore, the polarized light-emitting layer 350 is composed by an arrangement of quantum rods with three diameters such that a mixing light composed of red light, green light and blue light may be emitted after the purple light irradiates on the quantum rod film 300.

What is different from the above embodiment is that in this embodiment the liquid crystal display panel 200 further comprises a color filter film 250 arranged on the lower surface of the upper substrate 210. The color filter film 250 splits the mixing light composed the red light, the green light and the blue light emitted from the quantum rod film 300. One of both of the upper substrate 210 and the lower substrate 220 are formed by the purple light filtering material. The purpose is to filter the purple light that is not absorbed by the quantum rod film 300 to further achieve the purpose of protect human eyes. Furthermore, the purpose of purple light filtering may also be achieved by coating a purple light filtering film (not shown) on the substrate.

In one embodiment, the quantum rod film 300 further comprises a protection layer 360 arranged on the upper surface and the lower surface of the polarized light-emitting layer 360. The polarized light-emitting layer 360 is capable of blocking water and oxygen to prevent the lifetime the oxidized quantum rod from rapid decay.

Furthermore, The liquid crystal display panel 200 further comprises a plurality of spacers 260 arranged between the upper substrate 210 and the lower substrate 220. The spacers 260 isolate the liquid crystal 240 into a plurality of regions, and each of the regions respectively corresponds to a transmissive region of the quantum rod film 300 to achieve the individual control on the primary color in different primary color region.

Of course, the liquid crystal display panel 200 further comprises a TFT (Thin Film Transistor) 270, a pixel electrode (not shown) and a common electrode (not shown). These technical features fall within the scope of understanding of the skilled person in the art, and are not repeated again.

The liquid crystal display module provided by the disclosure adopts the quantum rod material that may emit polarized light to replace the conventional color filter and the lower polarizer to achieve the purposes of high contrast, high color saturation, low power consumption and low cost. Theatrically the power consumption is ⅓ of that of the conventional liquid crystal display device. The power consumption is extremely low. And because there is no lower polarizer and RGB color filter layer, and the quantum rod film completely substitute the lower polarizer and RGB color filter layer, the components and the manufacture processes are fewer. The purpose of cost reduction is achieved. The quantum rod film may excite the polarized light. The light having different color may be obtained through adjusting the diameter of the quantum rod of the quantum rod film to emit the polarized with different wavelength. The display requirement of the liquid crystal display device is satisfied.

Figure 8:
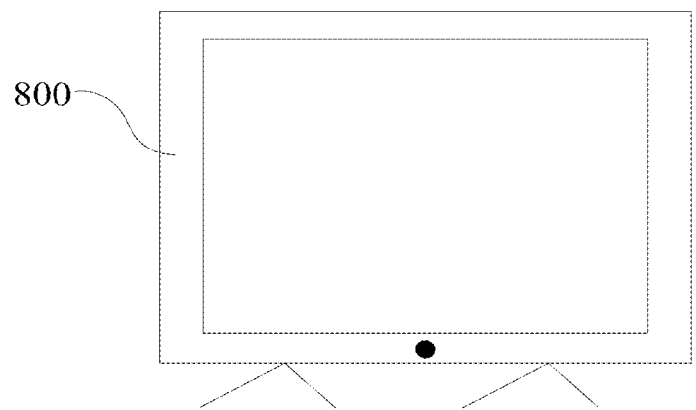
FIG. 8 is the schematic diagram illustrating the embodiment of the liquid crystal display device of the disclosure.

Furthermore, the embodiment further provides a liquid crystal display device. Refer to FIG. 8. FIG. 8 is the schematic diagram illustrating the embodiment of the liquid crystal display device of the disclosure. The liquid crystal display device comprises a housing 800 and the liquid crystal display module as described in the above embodiments arranged in the housing 800. The technical features of the liquid crystal display module may refer to the detailed description of the above embodiments. And the other technical features of the liquid crystal display module fall within the scope of understanding of the skilled person in the art, and are not repeated again.

Although the present disclosure is illustrated and described with reference to specific embodiments, those skilled in the art will understand that many variations and modifications are readily attainable without departing from the spirit and scope thereof as defined by the appended claims and their legal equivalents.

What is claimed is:

1. A liquid crystal display module comprising a backlight unit, a liquid crystal display panel, and a quantum rod film between the backlight unit and the liquid crystal display panel, wherein the liquid crystal display panel comprises:
   an upper substrate;
   a lower substrate, a liquid crystal filled between the upper substrate and the lower substrate; and
   an upper polarizer arranged at the outer side of the upper substrate, that is the light-emitting side of the liquid crystal display panel;
   wherein the quantum rod film is arranged between the lower substrate and the backlight unit and the quantum rod film is configured to convert light emitted from the backlight unit into polarized light and emit the polarized light into the liquid crystal display panel, the quantum rod film comprises a red quantum rod film region, a green quantum rod film region, a transmissive region spaced alternatively, and a polarizing layer arranged on the upper surface or the lower surface of the red quantum rod film region, the green quantum rod film region, and the transmissive region;

wherein the red quantum rod film region is configured to emit red light, the green quantum rod film region is configured to emit green light, and the transmissive region is configured to allow the light emitted from the backlight unit to pass through;

wherein the diameter of the red quantum rod film region and the diameter of the green quantum rod film region are different.

2. A liquid crystal display module comprising a backlight unit, a liquid crystal display panel, and a quantum rod film between the backlight unit and the liquid crystal display panel, wherein the liquid crystal display panel comprises:

an upper substrate;

a lower substrate, a liquid crystal filled between the upper substrate and the lower substrate; and an upper polarizer arranged at the outer side of the upper substrate, that is the light-emitting side of the liquid crystal display panel;

wherein the quantum rod film is arranged between the lower substrate and the backlight unit, and the quantum rod film is configured to convert light emitted from the backlight unit into polarized light and emit the polarized light into the liquid crystal display panel.

3. The liquid crystal display module according to claim 2, wherein the backlight unit provides blue backlight.

4. The liquid crystal display module according to claim 3, wherein the quantum rod film is arranged between the lower substrate and the backlight unit, the quantum rod film comprises a red quantum rod film region, a green quantum rod film region, a transmissive region spaced alternatively, and a polarizing layer arranged on the upper surface or the lower surface of the red quantum rod film region, the green quantum rod film region, and the transmissive region; wherein the red quantum rod film region is configured to emit red light, the green quantum rod film region is configured to emit green light, and the transmissive region is configured to allow the light emitted from the backlight unit to pass through; wherein the diameter of the red quantum rod film region and the diameter of the green quantum rod film region is different.

5. The liquid crystal display module according to claim 4, wherein the quantum rod film further comprises a protection layer arranged on the upper surface and the lower surface of the red quantum rod film region, the green quantum rod film region, and the transmissive region.

6. The liquid crystal display module according to claim 5, wherein the transmissive axis of the polarizing layer is parallel to the direction of the long axis of the quantum rod in the red quantum rod film region and the green quantum rod film region such that the light passing through different transmissive regions of the quantum rod film has the same polarization direction.

7. The liquid crystal display module according to claim 6, wherein the liquid crystal display panel further comprises a plurality of spacers arranged between the upper substrate and the lower substrate, the spacers isolate the liquid crystal into a plurality of regions, and each of the regions respectively corresponds to a transmissive region of the quantum rod film.

8. The liquid crystal display module according to claim 2, wherein the backlight unit provides purple backlight.

9. The liquid crystal display module according to claim 8, wherein the quantum rod film comprises a polarized light-emitting layer composed by an arrangement of quantum rods with three diameters and a protection layer arranged on the upper surface and the lower surface of the polarized light-emitting layer.

10. The liquid crystal display module according to claim 9, wherein the liquid crystal panel further comprises a color filter film arranged on the lower surface of the upper substrate, and the upper substrate and/or the lower substrate adopts violet filtering material or is coated with a violet filtering film.

11. A liquid crystal display device comprising a liquid crystal display module, the liquid crystal display module comprising a backlight unit, a liquid crystal display panel, and a quantum rod film between the backlight unit and the liquid crystal display panel, wherein the liquid crystal display panel comprises:

an upper substrate;

a lower substrate, a liquid crystal filled between the upper substrate and the lower substrate; and an upper polarizer arranged at the outer side of the upper substrate, that is the light-emitting side of the liquid crystal display panel;

wherein the quantum rod film is arranged between the lower substrate and the backlight unit, and the quantum rod film is configured to convert light emitted from the backlight unit into polarized light and emit the polarized light into the liquid crystal display panel.

12. The liquid crystal display device according to claim 11, wherein the backlight unit provides blue backlight.

13. The liquid crystal display device according to claim 12, wherein the quantum rod film is arranged between the lower substrate and the backlight unit, the quantum rod film comprises a red quantum rod film region, a green quantum rod film region, a transmissive region spaced alternatively, and a polarizing layer arranged on the upper surface or the lower surface of the red quantum rod film region, the green quantum rod film region, and the transmissive region; wherein the red quantum rod film region is configured to emit red light, the green quantum rod film region is configured to emit green light, and the transmissive region is configured to allow the light emitted from the backlight unit to pass through; wherein the diameter of the red quantum rod film region and the diameter of the green quantum rod film region is different.

14. The liquid crystal display device according to claim 13, wherein the quantum rod film further comprises a protection layer arranged on the upper surface and the lower surface of the red quantum rod film region, the green quantum rod film region, and the transmissive region.

15. The liquid crystal display device according to claim 14, wherein the transmissive axis of the polarizing layer is parallel to the direction of the long axis of the quantum rod in the red quantum rod film region and the green quantum rod film region such that the light passing through different transmissive regions of the quantum rod film has the same polarization direction.

16. The liquid crystal display device according to claim 15, wherein the liquid crystal display panel further comprises a plurality of spacers arranged between the upper substrate and the lower substrate, the spacers isolate the liquid crystal into a plurality of regions, and each of the regions respectively corresponds to a transmissive region of the quantum rod film.

17. The liquid crystal display device according to claim 11, wherein the backlight unit provides purple backlight.

18. The liquid crystal display device according to claim 17, wherein the quantum rod film comprises a polarized light-emitting layer composed by an arrangement of quantum rods with three diameters and a protection layer arranged on the upper surface and the lower surface of the polarized light-emitting layer.

19. The liquid crystal display device according to claim 18, wherein the liquid crystal panel further comprises a color filter film arranged on the lower surface of the upper substrate, and the upper substrate and/or the lower substrate adopts violet filtering material or is coated with a violet filtering film.

* * * * *